(12) United States Patent
Lewis

(10) Patent No.: US 10,730,778 B2
(45) Date of Patent: Aug. 4, 2020

(54) METHOD AND APPARATUS FOR INCREASING DEWATERING EFFICIENCY

(71) Applicant: F. Michael Lewis, El Segundo, CA (US)

(72) Inventor: F. Michael Lewis, El Segundo, CA (US)

(*) Notice: Subject to any disclaimer, the term of this patent is extended or adjusted under 35 U.S.C. 154(b) by 255 days.

(21) Appl. No.: 15/820,440

(22) Filed: Nov. 22, 2017

(65) Prior Publication Data

US 2018/0354835 A1    Dec. 13, 2018

Related U.S. Application Data

(60) Provisional application No. 62/444,012, filed on Jan. 9, 2017.

(51) Int. Cl.
| | |
|---|---|
| *C02F 11/14* | (2019.01) |
| *B01F 3/04* | (2006.01) |
| *B01F 5/00* | (2006.01) |
| *B01F 5/04* | (2006.01) |
| *C02F 11/147* | (2019.01) |
| *C02F 1/74* | (2006.01) |

(52) U.S. Cl.
CPC ............ *C02F 11/14* (2013.01); *B01F 3/0412* (2013.01); *B01F 3/04503* (2013.01); *B01F 5/0065* (2013.01); *B01F 5/0405* (2013.01); *B01F 5/0426* (2013.01); *C02F 11/147* (2019.01); *B01F 2005/0017* (2013.01); *B01F 2005/0051* (2013.01); *B01F 2215/0052* (2013.01); *C02F 1/74* (2013.01)

(58) Field of Classification Search
CPC ...................................................... C02F 11/14
See application file for complete search history.

(56) References Cited

U.S. PATENT DOCUMENTS

| | | |
|---|---|---|
| 3,334,868 A | 8/1967 | Lage |
| 3,661,364 A | 5/1972 | Lage |
| 3,666,663 A | 5/1972 | Walker |
| 4,303,470 A | 12/1981 | Meredith |
| 4,337,152 A | 6/1982 | Lynch |

(Continued)

OTHER PUBLICATIONS

Takahashi, Masayoshi, Journal of Physical Chemistry, "The Zeta Potential of Microbubbles in Aqueous Solutions," (Nov. 2005).

*Primary Examiner* — Peter Keyworth
(74) *Attorney, Agent, or Firm* — Bryan E. Johnson, Esq.

(57) ABSTRACT

A method and apparatus for increasing dewatering efficiency of a solids-laden liquid stream in a wastewater treatment facility, whereby a liquids-solids stream is pumped into a mixing apparatus in a closed-channel liquid flow conduit configuration, where the liquids-solids stream is intensely mixed with air and polymer in a mixing zone created by an adjustable flow restriction device, performing similar to a venturi to increase the velocity, agitation, and turbulence of the liquids-solids stream internal to the mixer, where the introduction of air and polymer to the stream is introduced independent of mixing energy. Compared with current methods and apparatuses to mix polymer with solids-laden wastewater, the present method and apparatus requires less energy, where it enables the addition of air independent of mixing energy, and it creates a zone of mixing with greater mixing efficiency via increased turbulence.

7 Claims, 9 Drawing Sheets

(56) References Cited

U.S. PATENT DOCUMENTS

| | | | |
|---|---|---|---|
| 5,514,267 | A | 5/1996 | Machiya |
| 5,820,256 | A | 10/1998 | Morrison |
| 7,014,775 | B2 | 3/2006 | Sharpe |
| 9,327,228 | B2 * | 5/2016 | Hegemann ............. B01D 47/10 |
| 2013/0220937 | A1 | 8/2013 | Capeau |

* cited by examiner

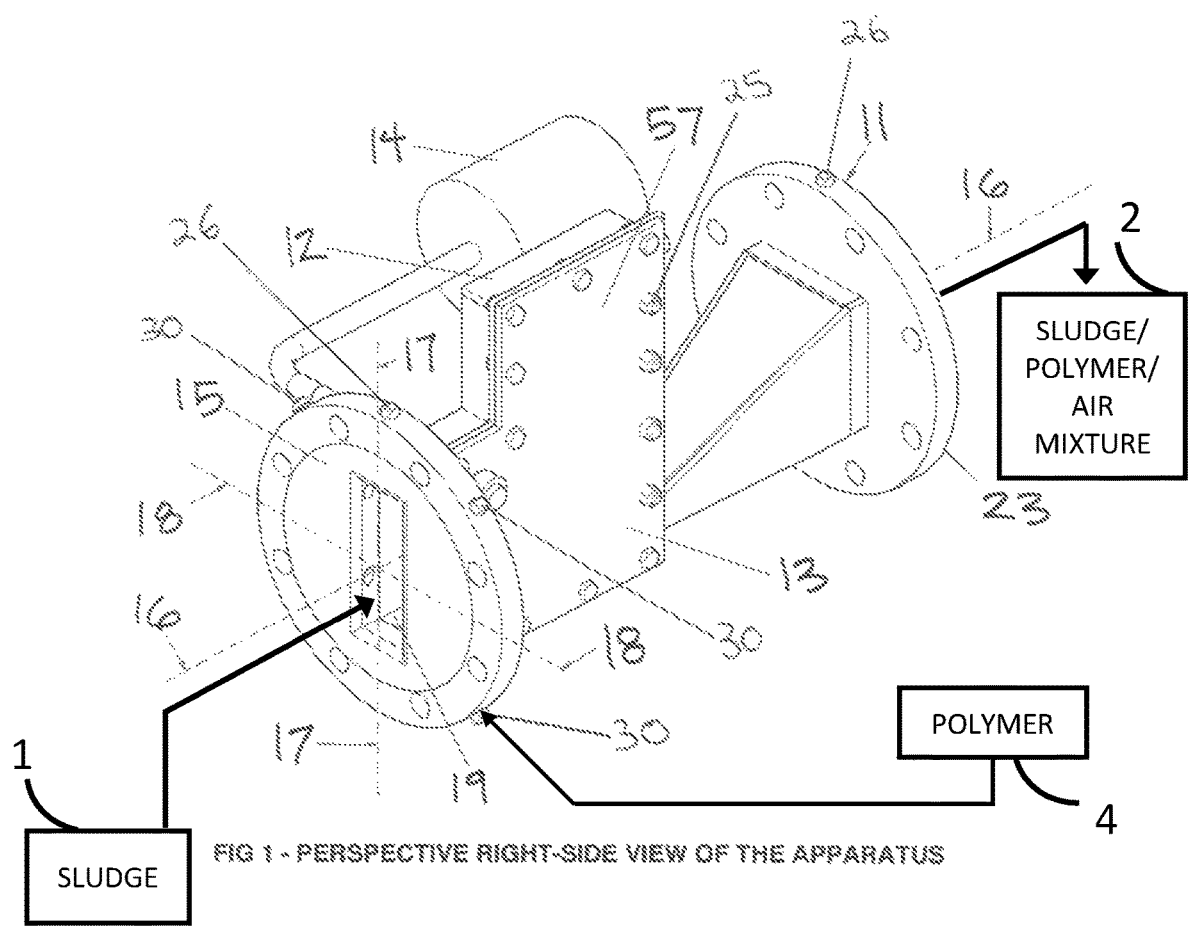
FIG 1 - PERSPECTIVE RIGHT-SIDE VIEW OF THE APPARATUS

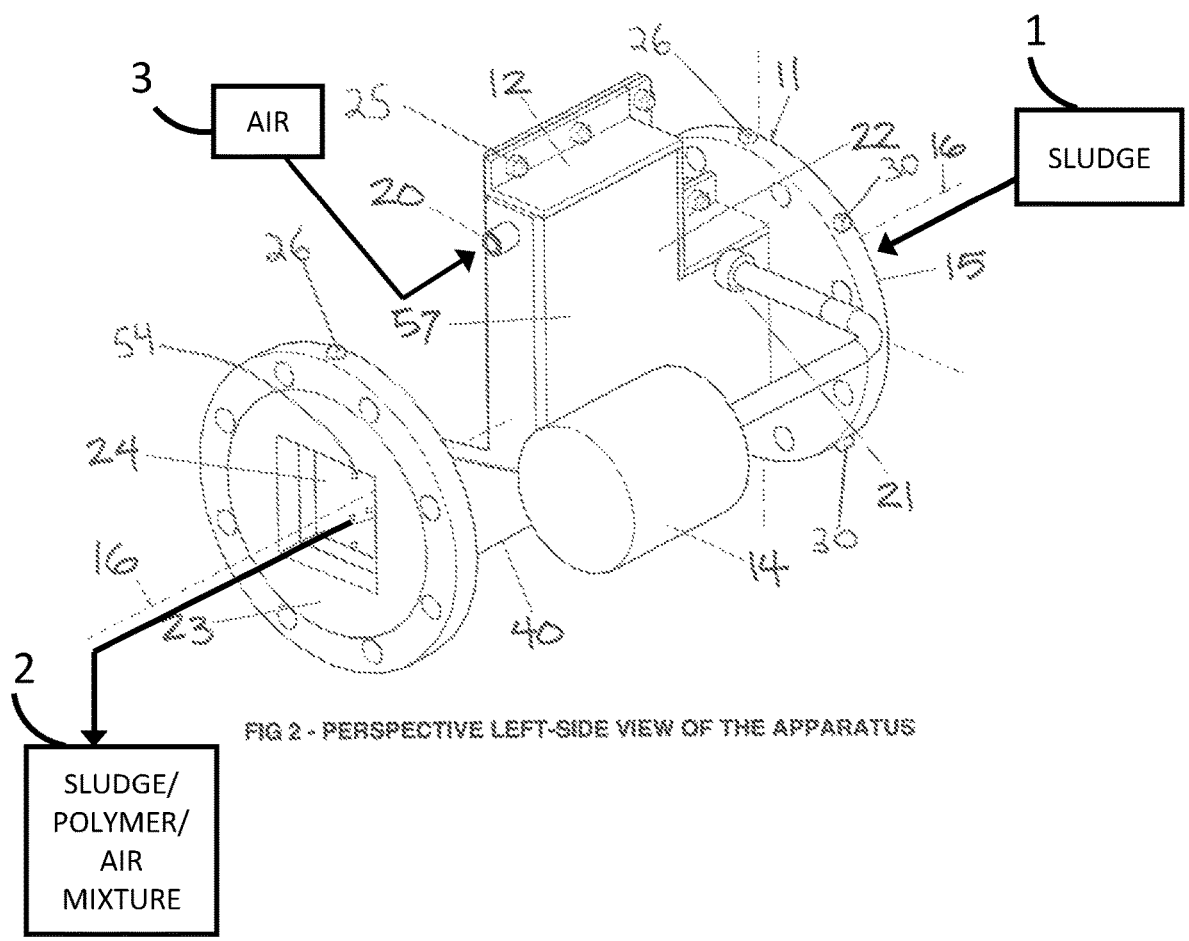
FIG 2 - PERSPECTIVE LEFT-SIDE VIEW OF THE APPARATUS

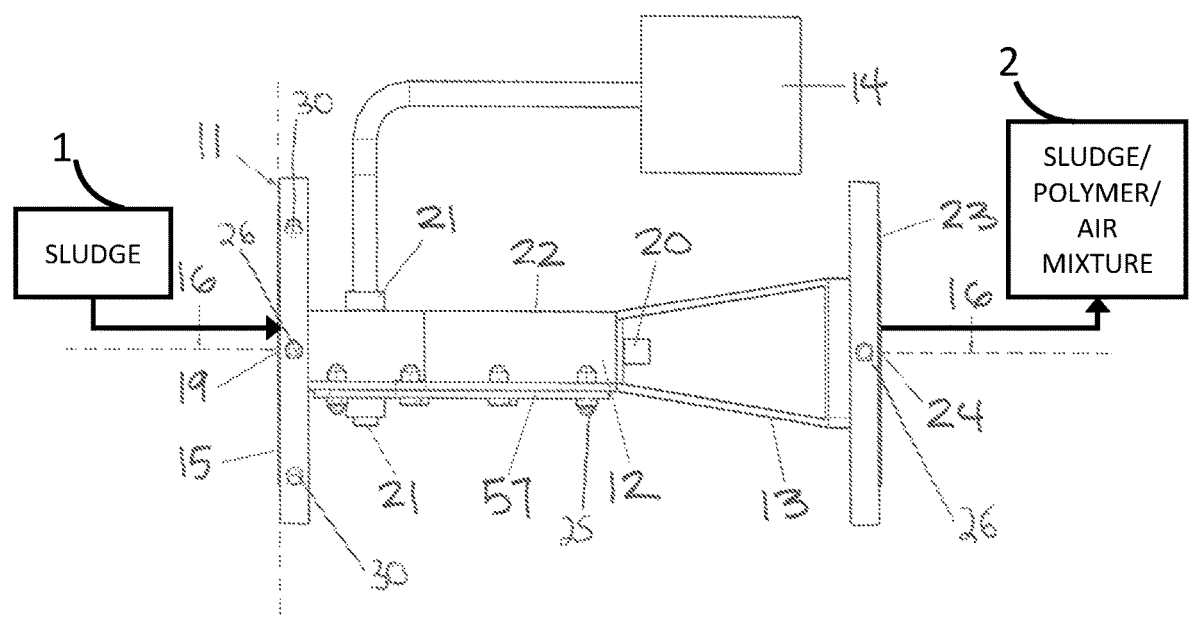
FIG 3 - PLAN VIEW OF THE APPARATUS

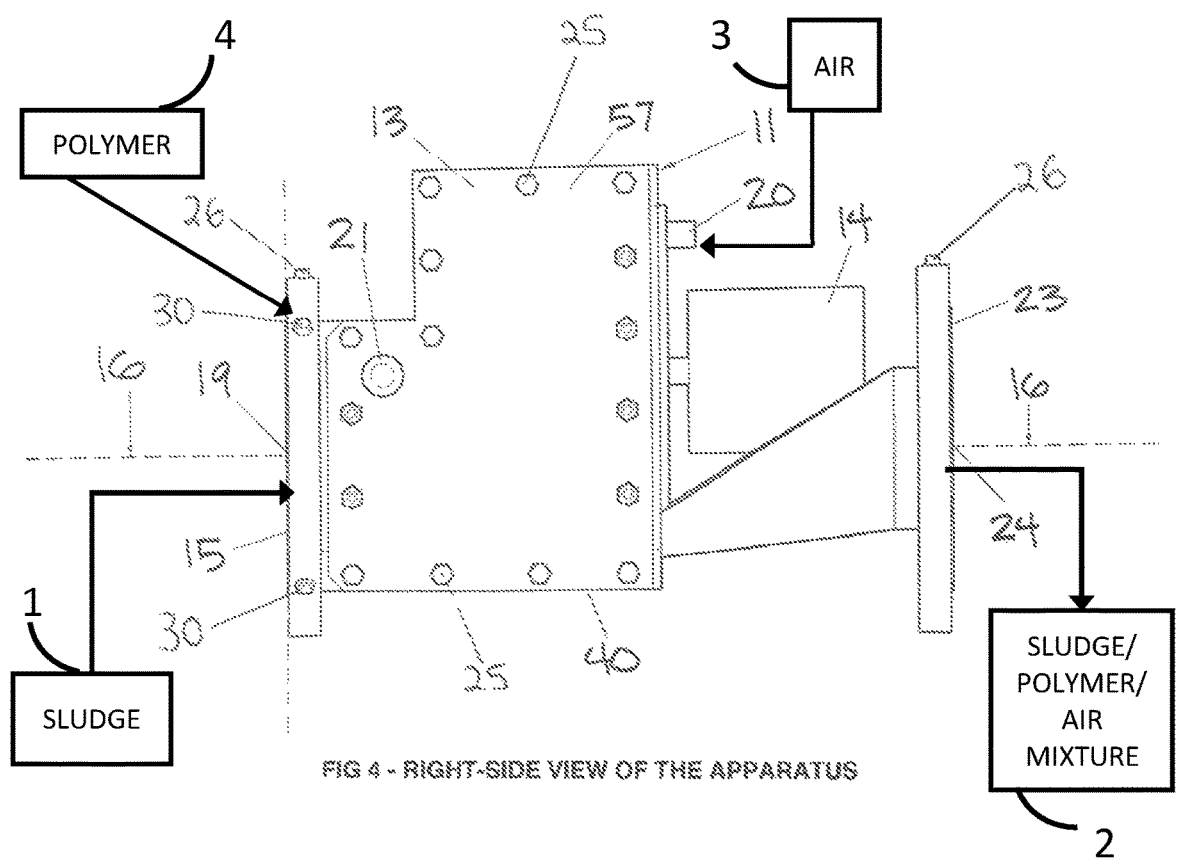
FIG 4 - RIGHT-SIDE VIEW OF THE APPARATUS

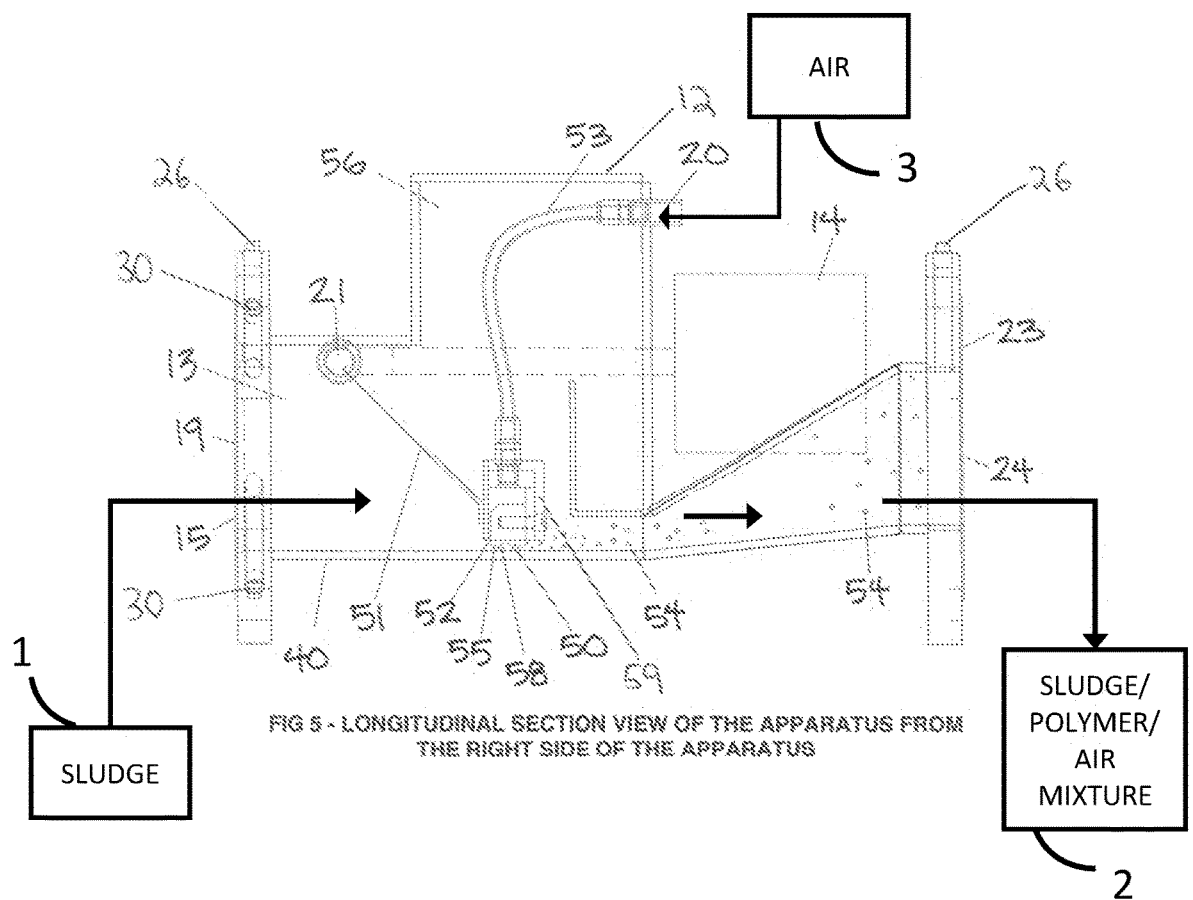

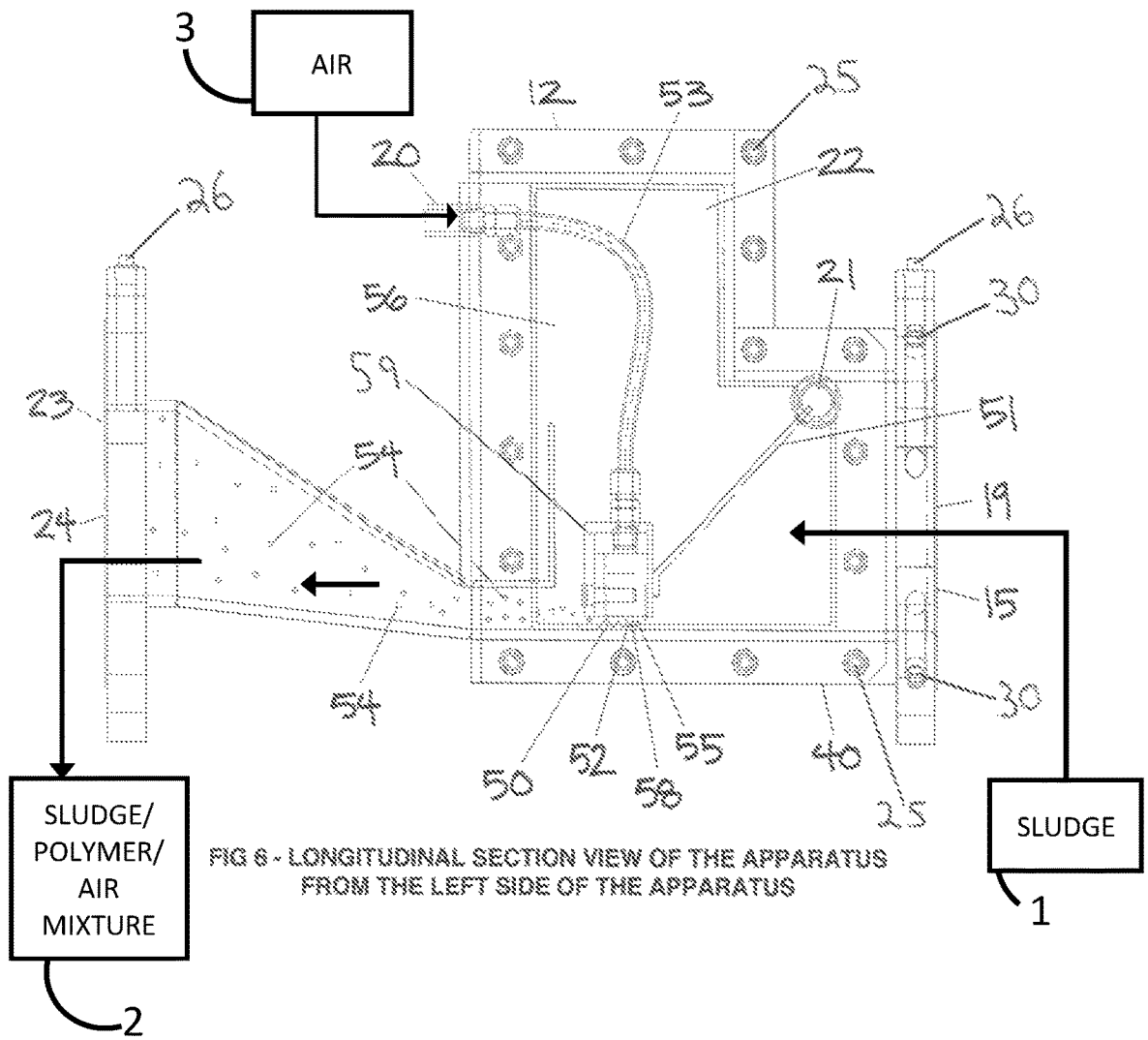

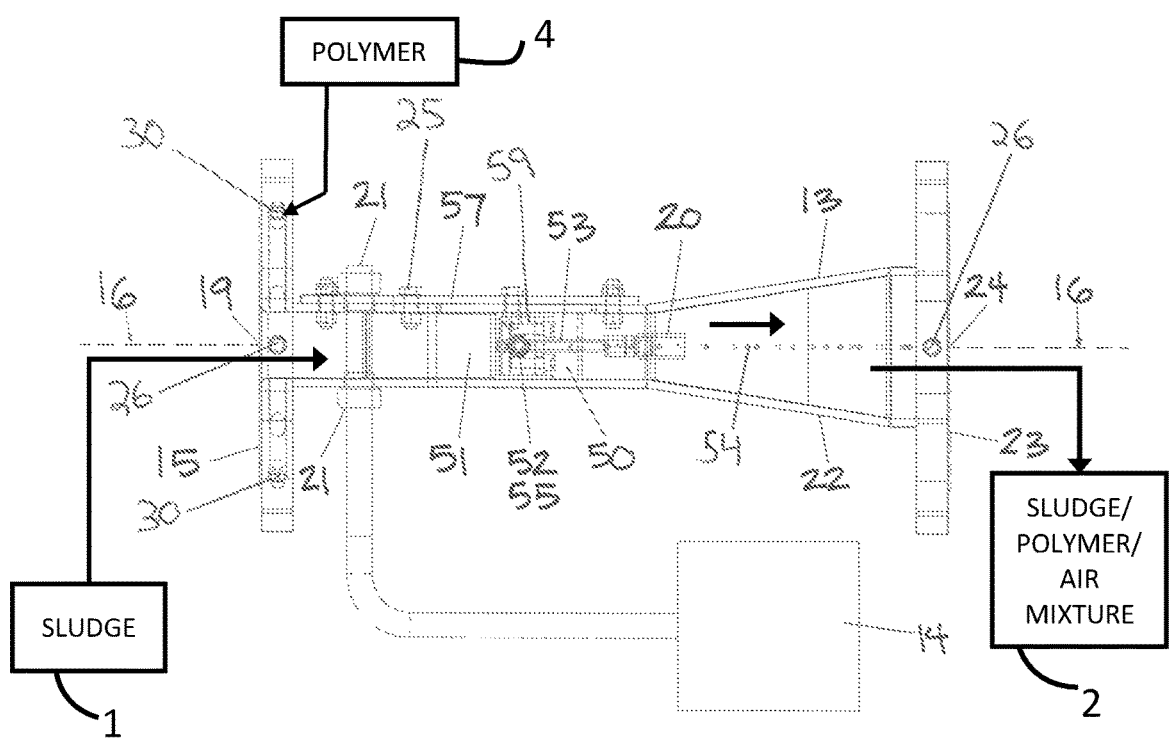
FIG 7 - LONGITUDINAL SECTION VIEW OF THE APPARATUS FROM UNDERNEATH THE APPARATUS

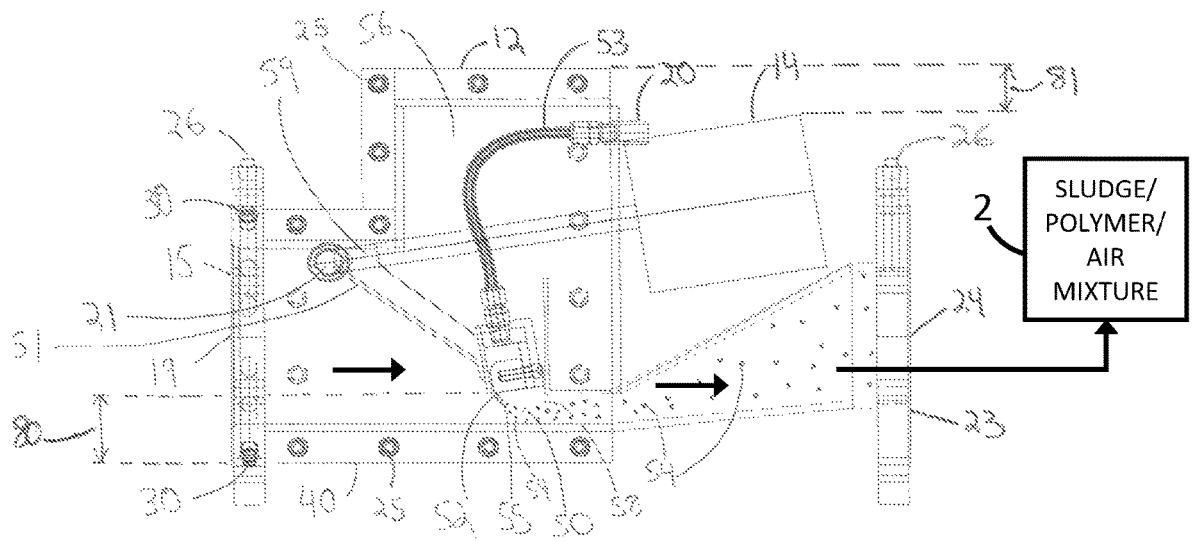
FIG 8 –LONGITUDINAL SECTION VIEW OF THE APPARATUS WHERE THE FLOW RESTRICTION DEVICE HAS BEEN CONTROLLABLY ROTATED TO A POSITION "A"

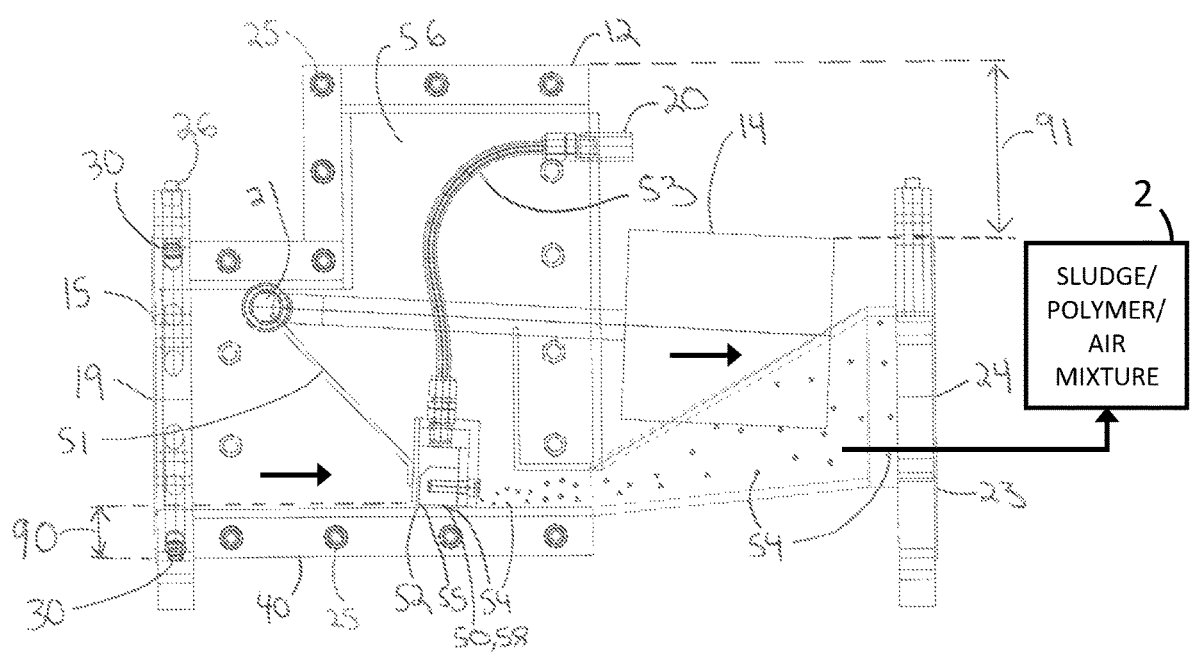
FIG 9 – LONGITUDINAL SECTION VIEW OF THE APPARATUS WHERE THE FLOW RESTRICTION DEVICE HAS BEEN CONTROLLABLY ROTATED TO A POSITION "B"

METHOD AND APPARATUS FOR INCREASING DEWATERING EFFICIENCY

CROSS-REFERENCE TO RELATED APPLICATIONS

This application claims the benefit of U.S. Provisional Patent Application No. 62/444,012, filed Jan. 9, 2017 by the present inventor

FEDERALLY SPONSORED RESEARCH

None.

SEQUENCE LISTING

None.

BACKGROUND

Prior Art

The following is a tabulation of some prior art that presently appears relevant:

U.S. Patents

| Patent Number | Priority Date | Inventor |
| --- | --- | --- |
| U.S. Pat. No. 7,014,775 | March 2002 | Sharpe et al. |
| U.S. Pat. No. 5,820,256 | May 1996 | Morrison |
| U.S. Pat. No. 5,514,267 | May 1996 | Machiya et al. |
| U.S. Pat. No. 4,337,152 | September 1978 | Lynch |
| U.S. Pat. No. 4,303,470 | June 1979 | Meredith et al. |
| U.S. Pat. No. 3,661,364 | February 1968 | Lage |
| U.S. Pat. No. 3,666,663 A | November 1969 | Walker |
| U.S. Pat. No. 3,334,868 | November 1962 | Lage |

U.S. Patent Application Publications

| Publication Number | Publ. Date | Assignee |
| --- | --- | --- |
| US 2013/0220937 A1 | August 2013 | Orege |

Nonpatent Literature Documents

Takagi, Shu, and Matsumoto, Y., Annual Review of Fluid Mechanics, Vol. 43, "Surfactant Effect on Multiscale Structure of Bubbly Flows" (2011), pp. 615-636.

Takahashi, Masayoshi, Journal of Physical Chemistry, "The Zeta Potential of Microbubbles in Aqueous Solutions," (November 2005).

Takahashi, Masayoshi, National Institute of Advanced Industrial Science and Technology—Japan, "The Fantastic Properties of Microbubbles," (undated)

Cho, H. Jeremy, Mizerak, Jordan P. and Wang, Evelyn N., Nature Communications, "Turning bubbles on and off during boiling using charged, surfactants," (Oct. 21, 2015).

BACKGROUND

Sludge is the semi-liquid residual material left from wastewater treatment processes, and consists of water and suspended particle pollutants such as microorganisms, mineral matter, and other particles.

It has been a challenge for Waste Water Treatment Plants (WWTP) to treat and dispose of the increasing volumes of sludge, as the communities WWTPs serve are growing. Additionally, WWTPs adherence to restrictive environmental regulations plays a central role in pushing the need for effective and efficient sludge removal efforts.

Sludge removal efforts and the effectiveness and efficiency thereof can be greatly influenced by the effectiveness and efficiency at which water is removed from the sludge, where disposal fees are directly proportional to the weight of the sludge being removed. The weight of the water entrenched in the sludge makes up a majority of the weight of the sludge. It is therefore highly desirable to extract as much water from the sludge as possible. To extract the water from the sludge would greatly reduce sludge transport removal costs, and thereby effectively enhance sludge removal efforts by increasing its efficiency.

A method used to extract water from the sludge is the mixing of the aqueous sludge solution with a polymer used to aid the aggregation of the particles within the aqueous sludge solution, to thereby separate the particles from the water, enabling the water to be extracted from the aqueous solution more efficiently. In wastewater treatment, this method is part of the generically named "dewatering" process. Generally, following the separation of the water and particles while within the aqueous sludge solution, a mechanical means for separation (e.g. centrifuges, belt presses), which are known to persons of ordinary skill in the art of dewatering for a wastewater treatment process, is soon implemented to mechanically extract the water from the remaining solid sludge particles. The instant invention will provide an apparatus and method that will increase the efficiency of this dewatering process, by providing an apparatus and method that will increase the efficiency of the mixing of polymers into the sludge—where mixing efficiency is directly proportional to particle aggregation and water separation, and where the rate of air introduction and the mixing energy are independently variable.

In the aqueous sludge solution, many of the suspended particles have a negative surface charge and are surrounded by positive counter-ions, which cause the particles in the sludge to repel each other, in comport with the electrical forces of repulsion. In providing for an efficient dewatering process it is highly desirable for the suspended particles of this aqueous sludge stream to attract to one another and aggregate. To aid this process of particle aggregation, polymers are added to the aqueous sludge stream. Polymers are added to the aqueous sludge, and through adsorption—the adhesion of atoms, ions, or molecules from the polymers to the surface of the particle pollutants, where a film of the polymers is left on the surface of the particles—the particles are enabled to overcome the electrical forces of repulsion, and become attracted to one another, in comport with Van der Waals forces. The effectiveness of the polymer addition to the sludge side-stream, to further the process of adsorption, increases the effectiveness of wastewater treatment, where it aids particle aggregation.

Rapid mixing is the process by which the polymer is rapidly dispersed throughout the aqueous sludge solution, where the particles are brought into contact with one another to form flocs (through the process of flocculation), which enables the free water to be removed in dewatering. The rapid mixing stage is quite possibly the most important stage of the dewatering process, and drives the effectiveness and efficiency of the dewatering process as a whole. The principal parameter governing the rate of flocculation is the velocity gradient applied to the sludge/polymer mixture. Velocity gradients can be induced by multiple means, readily known by those ordinarily skilled in the art of pipe liquid flow and air/liquid contact in pipe, such as through the use of a venturi (known in function to be a constricted area of a pipe, narrowed to effect a pressure and velocity change in the fluid traveling through the narrowed section). The instant invention will induce a velocity gradient change through a mechanical means (hereinafter also described as a flow restriction device), such as a venturi, to increase mixing efficiency.

Additionally, where turbulence is created, a pressure gradient effect is also anticipated. Where the infusion of air and polymer into an aqueous sludge solution occurs and creates an increase in turbulence, then a pressure gradient change will also be exhibited, and mixing will be aided. The instant invention will aid in increasing the pressure gradients through the novel infusing of air and polymer into the area of the pipe directly downstream of venturi-induced gradient change. The said mixing zone will hereinafter be called the zone of intense mixing.

It is highly desirable to increase the efficiency of the dewatering process—intended to increase its total solids (T.S.) content. Even small dewatering efficiency improvements (1% T.S.-2% T.S.) will have a significant impact on improving overall disposal economics. Unfortunately, increases in the efficiency of dewatering occur with increases in mixing energy or increases in polymer dosing, which are accompanied by undesirable increases in operational costs. The desirableness of efficiency improvement methods, such as increasing mixing energy or polymer dosing, is thereby mitigated by their cost-prohibitive nature, which makes the necessity of an economical apparatus and method for increasing dewatering efficiency readily apparent, which is satisfied with the present method and apparatus.

SUMMARY OF THE INVENTION

The instant method and apparatus is for improving dewatering efficiency in the field of wastewater treatment, and more specifically in the field of polymer addition to a sludge stream (i.e. a dilute phase biosolids stream), where a user may introduce air and coagulant into the sludge stream, independent of mixing energy, and where a user may create a zone of intense mixing for the dilute phase biosolids-air-polymer stream. The present and novel method for improving dewatering efficiency comprises the addition of air and polymer to a sludge stream, where the bubbles are infused through an in-stream bubble infusion device (also called a sparger) into the sludge stream at a location along the sludge stream immediately downstream of the polymer addition and immediately downstream of the mechanical means to induce a velocity gradient change in the sludge stream, which will be done through the use of an adjustable flow restriction device. The bubbles are introduced to the sludge stream at an angle perpendicular to the sludge flow streamlines at the interface of the air outlet orifice and the sludge stream. Where the sludge flowrate is increased, in combination with the effect of the added polymer and the added air into the sludge stream, a zone of turbulent and intense mixing of the components in the stream occurs, and mixing will therefore be enhanced.

The introduction of the air into the sludge-polymer stream at an angle perpendicular to the sludge streamline at the interface of the air outlet and the sludge stream promotes the shearing of air bubbles into the sludge-polymer stream by the increased perpendicular velocity of the sludge-polymer stream—prompted by the velocity gradient increase of the sludge-polymer stream as it passes through the flow restriction device—where the shearing creates bubbles of the infused air with diameters of lengths shorter than what ordinarily occurs during the infusion of air into a sludge stream flowing under typical flow, or static flow patterns of sludge flowing within a pipe, where the sludge flow rate has not been increased by an adjustable flow restriction device immediately upstream.

The present novel method and apparatus will create a zone of intense mixing at an intensity higher than that which occurs in typical pipe sludge flow, where polymer and air are introduced to a sludge-filled pipe of the dewatering process. The zone of intense mixing will be generated by and defined as the induced increase in the sludge flow rate (i.e. velocity gradient)—caused by the adjustable flow restriction device and throat that constricts the cross-sectional flow area of the incoming sludge and polymer—in combination with the turbulence generated by the infusion of air bubbles into the same stream at the throat of the apparatus, immediately downstream of the adjustable flow restriction device. Additionally, the zone of intense mixing will effectively mix the polymer—which will have been added to the sludge immediately upstream of the adjustable flow restriction device—into the dilute phase biosolids stream.

Also, the rate of air introduction and mixing energy will be independently variable, where here, the flow restriction device will employ a control means for a setpoint pressure drop known to those of ordinary skill in the arts of fluid flow within pipe, to keep the pressure drop relatively constant over anticipated changes in the sludge flowrate of a dewatering process in a wastewater system. Where the pressure drop remains constant, the mixing energy will also remain essentially constant. A control means may be a counterweighted arm, external to the pipe, that mechanically controls the position of an internal pipe flow restriction device, performing in unison, analogous to the unified movements of a pipe valve and its external valve position control means.

The apparatus can comprise a pipe or other closed-channel liquid flow conduit with a liquid inlet and liquid outlet at opposed axial ends, having an air plenum radially connected, having an air conduit connected to the air plenum, an air inlet, a bubble infusion device (i.e. sparger), an air outlet where an air outlet is fixedly attached to a sparger, a polymer inlet, where a polymer inlet may be a polymer injection port, a liquid conduit axially connected to the polymer inlet, and an air-liquid outlet, a flow restriction device internally mounted within the pipe or other closed-channel liquid flow conduit.

A polymer inlet may be in multiple, with multiple ports to deliver polymer at multiple locations into the sludge flow stream, and is immediately upstream of the flow restriction device. Where in multiple, the polymer inlets may be positioned and deliver polymer at multiple locations circumferentially around the pipe or other closed-channel liquid flow conduit, to aid uniform distribution of the polymer, to ultimately aid mixing of the polymer within the sludge flow stream.

The flow restriction device may have its physical position within the pipe or conduit controlled by a mechanical means to impede the flow direction and flow rate of the sludge stream within the pipe or conduit. The flow restriction device is provided to control the pressure drop of the sludge stream within the pipe or conduit and to increase the velocity of the sludge stream and mixing energy within the pipe or conduit, analogous to the effect of a venturi.

The flow restriction device will function as a converging section of the pipe, and may be adjusted by its rotation along the axis of its pivot point, which may rotate the flow restriction device within a range of positions that either impedes the cross-sectional flow area of the incoming sludge within the pipe or facilitates unimpeded cross-sectional flow of the incoming sludge. The flow restriction device is fixedly and radially attached to the axis located at the pivot point. The flow restriction device has a width in the horizontal plane that may extend to the width of the apparatus, from the left side wall to the right side wall. The flow restriction device is a height in the vertical plan, when rotated vertically down into the pipe or conduit, and further into the cross-sectional flow of the sludge, that may extend from the top to the bottom of the apparatus, to impede the cross-sectional flow of the sludge. The flow restriction device will induce an increase in the velocity of sludge flow in a manner analogous to a venturi, where a converging section of a pipe increases the velocity of the contents flowing in the pipe and a corresponding pressure drop.

The flow restriction device is fixedly attached to the sparger. The sparger and the pivot point are at diametrically opposed ends of the flow restriction device. The sparger emits the air into the sludge stream, where the air is introduced into the sludge stream as bubbles. The sparger is immediately upstream of the throat. The flow restriction device rotates along its pivot point to raise and lower the sparger inside the conduit or pipe.

The rotating axis of the pivot point of the flow restriction device may traverse the inside of the pipe or closed-channel conduit, from the left-side wall to the right-side wall, through the boundary walls of the pipe or closed-channel liquid flow conduit, and engage a counterweighted arm that will be radially connected to the rotating axis of the pivot point of the flow restriction device. The rotation of the pivot point axis may be controlled by the counterweighted arm, which may rotate circumferentially around the axis of the pivot point, where the counterweighted arm may be connected to the pivot point axis at a distance from the external wall of the pipe or closed-channel conduit that will allow unhindered rotation of the counterweighted arm and its counterweight around the axis of the pivot point.

Accordingly, several advantages of the present invention and apparatus are 1) to create a turbulent zone of mixing for polymer, air, and sludge to aid dewatering, and 2) to independently vary the rate of air introduction and mixing energy, and 3) to increase the production of bubbles at diameters smaller than those introduced into a static liquid stream or stream flowing under typical wastewater flow conditions, by perpendicularly introducing air into a high velocity sludge stream immediately downstream of polymer injection, to enable effective shearing of bubbles into the stream, and 4) to increase the solids content of the sludge stream while using less polymer than that traditionally needed for the same solid content, and 5) to save financial resources as a result of the decreased need for polymer.

DESCRIPTION

It is the purpose of this instant invention to define a process and illustrate an apparatus that improves dewatering efficiency during mixing of the air and liquid of the system, by increasing the percentage of total solids in the biosolids and decreasing the percentage of water content, or by decreasing the volume of polymer dosing to the biosolids stream, or by decreasing the energy used to mix the dilute phase of biosolids with polymer.

The instant method and apparatus for increasing the efficiency of the dewatering process delivers air and polymer to the aqueous sludge solution in a manner conventional to air-liquid mixing systems. A myriad of air inducing means may be utilized to infuse air into the aqueous sludge solution, where the means must entrain the air or compress the air to a pressure equal to or greater than the static head at the desired liquid depth.

The apparatus can compromise a pipe or other closed-channel liquid flow conduit with a liquid inlet and liquid outlet at opposed axial ends, having an air plenum radially connected, having an air conduit connected to the air plenum, an air inlet, a polymer inlet, where a polymer inlet may be a polymer injection port, a liquid conduit axially connected to polymer injection port, a liquid inlet, and an air-liquid outlet, a flow restriction device internally mounted within the pipe or other closed-channel liquid flow conduit, a flow restriction device controller controllably attached to the flow restriction device. The air plenum will be comprised of separate space cavity for air to aggregate and from which the infusion of the air into the aqueous stream will occur. The air space will be of a dimension where an air conduit may traverse its cavity without restriction. The air plenum space cavity may be a solid hollow structure, or a hollow cavity made from a multiple walls fastened together by a fastening means, such as a nut and bolt.

The aqueous sludge stream will flow from the sludge flow inlet of the apparatus, past the flow restriction device, past the sparger, and out the sludge flow outlet. Polymer may be introduced into the aqueous sludge stream within the pipe or other closed-channel liquid flow conduit, by various polymer pumping devices known to those ordinarily skilled in the arts, through polymer injection ports circumferentially located in the perimeter wall of the pipe or other closed-channel liquid flow conduit, where the polymer may be discharged from the ports to the internal space of the channel. According to a preferred but optional feature of the invention, the ports are shaped as nozzles directed toward the axis of flow of the sludge stream.

The air conduit can be comprised of a flexible hose, that may allow for unimpeded flow of air through the conduit into the air plenum, and that may not have an effect on the position of the flow restriction component, which can be comprised of a flow restrictor plate, or valve, or that known by a person of ordinary skill in the arts of liquid and air flow within a pipe or in the field of dewatering or wastewater treatment to restrict the flow of the liquid in the pipe or other closed-channel liquid flow conduit.

The air can be entrained into the liquid through the air inlet by various air pumping devices known to those ordinarily skilled in the arts, at an angle perpendicular to the axial flow of the liquid, which aids in increasing the turbulence in the pipe or other closed-channel liquid flow conduit, due to the effect of the velocity gradient being applied to the liquid flow through the pipe or other closed-channel liquid flow conduit.

The air inlet may be radially connected to the pipe or other closed-channel liquid flow conduit, perpendicular to the axial plane of the pipe or other closed-channel liquid flow conduit.

The air will be introduced into the liquid stream at a pressure greater than or equal to a pressure required to overcome any opposing forces of the liquid stream that will prevent the intrusion of the air into the liquid stream. The air will be introduced in the liquid stream at a pressure greater than or equal to a pressure required to allow for intrusion of the air into the portion of the pipe or other closed-channel liquid flow conduit at a location at least along the internal wall of the pipe or other closed-channel liquid flow conduit, containing the liquid stream, to a distance radially inward from the internal wall into the liquid stream. The density of the aerated water at the outlet of the apparatus will be less than the density of water.

The air will be introduced into the liquid stream at a distance along the axial plane of the pipe or other closed-channel liquid flow conduit, where the velocity gradient created by the pressure drop has maximized.

The air introduced into the liquid stream can be introduced through an orifice of a diameter less than that of the diameter of the pipe or other closed-channel liquid flow conduit. The air introduced into the liquid stream can be introduced into the liquid stream at a constant flow or at intermittent patterns through the orifice.

It is a feature of the instant method and apparatus that the perpendicular velocity of the liquid stream will effectively sheer air being introduced to the liquid stream into air bubbles with diameters less than the diameters of bubbles from air being introduced into a static liquid stream. It is also a feature of the instant method and apparatus that the perpendicular velocity of the liquid stream will sheer the air bubbles more effectively where air is being introduced into a liquid stream at a location along the axial flow of the liquid stream where mixing energy is maximized by the increased perpendicular velocity maximized by an internal flow restriction device, than at another location. The air bubbles being sheared into the liquid stream at the turbulent zone may continue for approximately 4-10 pipe diameters downstream in what is termed "bubbly flow" (also known as "bubbly swarm").

Associated with bubbly flow (aka bubbly swarm) are complex interactions between the bubble interfaces and also between the bubbles and the liquid, such as bubbles interacting with one another through collisions or the effects of wakes caused by the bubbles. The phenomenon is explained by the Marangoni effect, which can be seen by bubbles in liquid presenting surfactants, such as contaminated water. Where surfactants are present in water, bubbles experience a surface concentration distribution along the bubble surface, which accumulates in the rear part of the bubble as it rises, which causes a tangential sheer stress on the bubble surface, resulting in the decrease in the rising velocity of a bubble in contaminated water. In some cases, the bubble can become so contaminated that its rising velocity equals the same drag coefficient of a rigid particle is reached, and will behave like a rigid particle in water. Additionally, electric charges are created by the formation and interactions of these "bubbly flow" bubbles, which further aids the charge-driven activity of floc formation, thereby increasing the effectiveness of the present method and apparatus.

The aqueous biosolids stream will flow in a pipe or other closed-channel liquid flow conduit, where the flow in the pipe or other closed-channel liquid flow conduit is capable of being restricted in a particular section by a restriction device, that can be comprised of a restrictor plate or restricting valve, which can induce a pressure change and velocity change in the fluid flowing from the sludge flow inlet to the sludge flow outlet. The flow restriction device may be capable of autonomous control.

Another feature of the self-contained apparatus and method for increasing the efficiency of dewatering by mixing air and liquid in a high turbulence region within a pipe or other closed-channel liquid flow conduit, is its ability to scale to any size with current technology and materials, whether a small dewatering process that treats less than 5 million gallons per day, or whether a large dewatering process that treats more than 100 million gallons per day.

Another feature of the apparatus and method for increasing the efficiency of a dewatering process by mixing air and liquid in a high turbulence region within a pipe or other closed-channel liquid flow conduit, is its ability to oppose a leading liquid flow with a flow restriction device, which can be comprised of an adjustable restrictor plate, rotatably connected to the internal perimeter of the pipe or confined space, to direct the angle of liquid flow in a direction to flatten or optimize the shape of the liquid medium, to add velocity to the liquid medium. The flow restriction device will reduce the liquid cross sectional flow area, thereby increasing the turbulence in this zone of intense mixing.

Another feature of the apparatus and method for increasing the efficiency of a dewatering process by mixing air and liquid in a high turbulence region within a pipe or other closed-channel liquid flow conduit is its ability to vary the efficiency, pressure, or velocity, of intake of air in the liquid medium.

Another feature of the apparatus and method for increasing the efficiency of a dewatering process by mixing air and liquid in a high turbulence region within a pipe or other closed-channel liquid flow conduit is its ability to pump very large volumes of liquid medium through the mixing region while using much less energy or power than conventional processes and apparatuses that aid in dewatering.

Another feature of the apparatus and method for increasing the efficiency of a dewatering process by mixing air and liquid in a high turbulence region within a pipe or other closed-channel liquid flow conduit is its ability to intake liquid medium at a depth or strata (level) of the liquid medium and discharge liquid medium at a depth or strata of the liquid medium resulting in the ability to mix horizontal layers or strata of the liquid medium.

Another feature of the apparatus and method for increasing the efficiency of a dewatering process by mixing air and liquid in a high turbulence region within a pipe or other closed-channel liquid flow conduit is its ability to enable inlet air to be acquired at one strata (level) and discharge at an outlet water-air mixture to be released or discharged at another strata.

The flow restriction device controller can be comprised of a counter-weighted arm, rotatably connected to the flow restriction device, and may be controlled through a counter-weighted arm. Other liquid pipe flow restriction control devices may be used, which are ordinarily known by a person of reasonable and ordinary skill in the art of liquid-air pipe flow controls.

A principal object of this instant invention is to allow for air to be introduced into the aqueous sludge stream at a rate independently variable from the mixing energy, enabled by a mechanical means to control a pressure drop in the liquid channel at rates where aqueous sludge stream flow rates change by no more than 33 percent. To a person or ordinary skill in the art of liquid air mixing, there are multiple mechanical controller means to meet the object of pressure control to maintain a desired pressure drop of the aqueous sludge over a range of sludge flows at flow rates that change by no more than 33 percent.

Specifically, a means to meet the object of pressure control to maintain a desired pressure drop can be accomplished through the use of a counterweighted arm that is rotatably connected to a flow restriction device that will control a pressure drop in the liquid channel. A means for gauging pressure is an object of this instant invention, which may be accomplished by a pressure gauge means at locations both upstream and downstream of the flow restriction device.

A principal object of this instant method and apparatus to increase dewatering efficiency will add polymer to the sludge stream occurring at a location along the axial flow direction of the aqueous sludge stream, at a radially connected location in the immediate vicinity upstream of the zone of intense mixing, occurring within the pipe or other closed-channel liquid flow conduit.

The invention has been described in an illustrative manner, and it is to be understood that the terminology which has been used is intended to be in the nature of words of description rather than of limitation. Obviously, many modifications and variations of the present method and apparatus are possible in light of the above teachings. For example, the flow restriction device, internally attached to the pipe or conduit can be either a flow restrictor plate or valve. Additionally, the nozzle from which air is delivered into the sludge flow can be either a nozzle or a porous aeration stone, or a piece of metal screening. It is therefore, to be understood that within the scope of the above description, the invention may be practiced otherwise than as specifically described.

DRAWINGS

FIG. 1 is a perspective right-side view of the apparatus, constructed in accordance with the invention.

The presently preferred embodiment of the apparatus herein to increase dewatering efficiency, according to the invention is shown in FIG. 1.

FIG. 2 is a perspective left-side view of the apparatus.

FIG. 3 is a plan view of the apparatus.

FIG. 4 is a right-side view of the apparatus.

FIG. 5 is a longitudinal section view of the apparatus from the right side of the apparatus.

FIG. 6 is a longitudinal section view of the apparatus from the left side of apparatus.

FIG. 7 is a longitudinal section view of the apparatus from underneath the apparatus.

FIG. 8 is a longitudinal section view of the apparatus from the right side of the apparatus where the flow restriction device and sparger have been controllably rotated by the counter-weighted arm to a position a distance "A" above the bottom of the apparatus.

FIG. 9 is a longitudinal section view of the apparatus from the right side of the apparatus where the flow restriction device and sparger have been controllably rotated by the counter-weighted arm to a position a distance "B" above the bottom of the apparatus.

FIG. 8 and FIG. 9, in contrast, showcase the movement of the flow restriction device and sparger, as a function of the movement of a means to control their movement (i.e. counter-weighted arm).

DRAWING REFERENCE NUMERALS 1 sludge
2 sludge/polymer/air mixture
3 air source
4 polymer source
11 apparatus
12 top of the apparatus
13 right side of the apparatus
14 counter-weighted arm
15 front of the apparatus
16 longitudinal axis
17 vertical axis
18 horizontal axis
19 sludge flow inlet
20 air inlet
21 pivot point for flow restriction device
22 left side of the apparatus
23 back of apparatus
24 sludge flow outlet
25 fastening means for air plenum
26 pressure gauge means
30 polymer inlet
40 bottom of apparatus
50 zone of intense mixing
51 flow restriction device
52 air introduction orifice
53 air conduit
54 air bubble
55 location of air bubble shearing
56 air plenum
57 external wall of air plenum
58 throat
59 sparger
80 height "A" of sparger above the bottom of the apparatus
81 distance "X" of counter-weighted arm from top of apparatus
90 height "B" of sparger above the bottom of the apparatus
91 distance "Y" of counter-weighted arm from top of apparatus

DETAILED DESCRIPTION OF ILLUSTRATIVE EMBODIMENTS

A method and apparatus to increase the efficiency of downstream dewatering in wastewater treatment through a cost-effective increase in the mixing efficiency of a sludge-polymer-air aqueous stream according to a preferred embodiment of the present invention will now be described with reference to FIGS. 1-9.

Referring now to FIG. 1 of the drawings, the apparatus 11 will receive the influent sludge 1 stream through its sludge flow inlet 19 at the front of the apparatus 15, and may pass through the apparatus 11 to the back of the apparatus 23, along the longitudinal axis 16, so that the sludge flow may be mixed with air from an air source 3 and polymer from a polymer source 4 in the zone of intense mixing 50.

Referring now to FIG. 2 of the drawings, the apparatus discharges its sludge-polymer-air stream 2 through its sludge flow outlet 24 at the back of the apparatus 23, after passing through the apparatus 11 along the longitudinal axis 16, where the sludge 1 will have mixed with air and polymer in the zone of intense mixing. An air inlet 20 is seen near the top of the apparatus 12, where air will be provided from an air source 3 by a means to produce air, such as a compression pumping device, to be delivered to an air conduit 53 within an air plenum 56, that will affect the transport of the air into the flow of sludge 1 through the apparatus. The walls of the air plenum may be fastened together with a fastening means 25. Pressure will be gauged with a pressure gauge means 26.

Referring now to FIG. 3 of the drawings, a plan view of the apparatus 11 shows a counter-weighted arm 14 radially connect to the axis of the pivot point for the flow restriction device 21. The counter-weighted arm 14 circumferentially rotates about the axis of the pivot point for the flow restriction device 21, and controls the circumferential rotation of the pivot point axis. The counter-weighted arm is on the left side of the apparatus 22, but alternative embodiments cold relocate the counter-weighted arm 14 to another location around the apparatus 11. A plurality of mechanical control technologies to a personal of ordinary skill in the art of pipe flow control could be used in place of a counter-weighted arm 14.

Referring now to FIG. 4 of the drawings, the apparatus 11 is show from its right side 13, showcasing the external wall of the air plenum 57 that houses the air conduit 53, which received air from an air source 3 to the air inlet 20.

Referring now to FIG. 5 of the drawings, the flow restriction device 51 is radially and rotatably attached to the pivot point for the flow restriction device 21, which is controlled via circumferential movement of the counter-weighted arm 14 about the pivot point for the flow restriction device 21. The direction of flow of the sludge 1 travels from the front of the apparatus 15 through the sludge flow inlet 19, past the sludge flow restriction device 51, through the throat 58 and zone of intense mixing 50. The zone of intense mixing 50 is created by the high turbulence in the sludge flow immediately downstream of the flow restriction device 51, where air is being introduced from an air source 3 into the sludge stream through an air introduction orifice 52. The sludge flows at a velocity high enough that shears the air being introduced perpendicular to the sludge stream through the air introduction orifice 52, within the throat 58. The air bubbles 54 created by the shearing effect of the sludge velocity may continue for approximately 4-10 pipe diameters downstream in "bubbly flow."

FIG. 6 is identical to FIG. 5, but rotated 180 degrees about the vertical axis 17 of the apparatus 11, as shown in FIG. 1.

Referring now to FIG. 7 of the drawings, the air introduction orifice 52 can be seen nearly midway along the longitudinal axis 16 of the apparatus 11, and introduces air into the flow of sludge 1 immediately downstream of the flow restriction device 51 at the throat 58, creating a zone of intense mixing 50, where there are small-diameter air bubbles 54 created at the location of air bubble shearing 55. The sludge flow 1 continues along the direction of the longitudinal axis 16 toward the back of the apparatus 23, before exiting at the sludge flow outlet 24.

Referring now to FIG. 8 of the drawings, the flow restriction device 51, fixedly attached to the sparger 59, is rotated circumferentially around the pivot point 21 of the flow restriction device 51 to height "A" 80 from the bottom of the apparatus 40, where the height of the flow restriction device 51 and the sparger 59 is controlled by the counter-weighted arm 14 radially connected to the pivot point 21 of the flow restriction device 51, which is positioned a distance "X" 81 from the top of the apparatus 12.

Referring now to FIG. 9 of the drawings, the flow restriction device 51, fixedly attached to the sparger 59, is rotated circumferentially around the pivot point 21 of the flow restriction device 51 to a height "B" 90 from the bottom of the apparatus 40, where the height of the flow restriction device 51 and the sparger 59 is controlled by the counter-weighted arm 14 radially connected to the pivot point 21 of the flow restriction device 51, which is positioned a distance "Y" 91 from the top of the apparatus 12. The difference between height "A" 80 of FIG. 8 and height "B" 90 of FIG. 9, correspond to the difference between the distance "X" 81 of FIG. 8 and distance "Y" 91 of FIG. 9 of the controlling counter-weighted arm 14. Height "A" 80 is not equal to height "B" 90. Distance "X" 81 is not equal to distance "Y" 91.

From the description above, a number of advantages of some embodiment of the method and apparatus 11 for increasing dewatering efficiency become evident:

a. A zone of intense mixing and high turbulence is created by reducing the liquid cross sectional flow area of the sludge stream with the adjustable flow restriction device 21, b. The zone of intense 50 mixing and high turbulence efficiently mixes the air 3 and polymer 4 into the biosolids stream.

c. The adjustable flow restriction device 51 enables the introduction of air 3 and polymer 4 into the biosolids stream independent of mixing energy, by maintaining a constant pressure drop in the sludge 1 flowing through the apparatus 11.

d. The perpendicular velocity of the sludge stream in the pipe, immediately downstream of the flow restriction device 51, effectively creates tiny bubbles 54 of air at the zone of intense mixing 50 by shearing tiny bubbles 54 into the sludge stream, which also increases mixing efficiency.

What is claimed is:

1. An apparatus for mixing wastewater sludge with polymer and air to increase efficiency of dewatering process for wastewater treatment, comprising:

(a) a mixer housing having a closed-liquid flow conduit configuration;
(b) a housing inlet at one end of said mixer housing;
(c) a housing outlet at opposed axial ends of said mixer housing;
(d) a fluid flow passage for a sludge stream to flow through said mixer housing from the housing inlet to the housing outlet;
(e) a rotating axis, said rotating axis traversing the opposed internal walls of the mixer housing at pivot points on the internal walls,
(f) a flow restriction device internal to mixer housing and mounted to said rotating axis;
(g) a controller means controllably engaged to flow restriction device, to control positioning of flow restriction device;
(h) an air plenum, radially connected to said mixer housing;
(i) an air inlet;
(j) an air conduit fixedly attached to air inlet
(k) a bubble infusion means fixedly attached to air conduit;
(l) an air pumping means for introducing the air, through the air inlet, through air conduit, and through said bubble infusion means, into the fluid flow passage;
(m) a plurality of polymer inlets circumferentially placed around said mixer, upstream of said bubble infusion means,
(n) a polymer conduit axially connected to said polymer inlets;
(o) a polymer pumping means for introducing polymer through the polymer inlets, and through the said conduit for polymer, into fluid flow passage;
(p) a zone of intense mixing for mixture of sludge-polymer-air, said zone immediately downstream of interface between the fluid flow passage and the bubble infusion means;
(q) a throat, said throat comprising an opening for sludge flow travel along the longitudinal axis of said mixer housing immediately downstream of zone of intense mixing, said throat having a cross-sectional area less than cross-sectional area of said housing inlet, said throat having a cross-sectional area less than cross-sectional area of said housing outlet;
(r) said bubble infusion means provided upstream of said throat section;
(s) a first conduit means connecting said throat to said housing inlet;
(t) a second conduit means connecting said throat to said housing outlet, said conduit means having a width that increases in a divergent manner as it moves axially from said throat to said mixer housing outlet; and
(u) pressure gauge means to measure pressure of sludge mixture inside housing.

2. The apparatus for mixing as set forth in claim 1, wherein said flow restriction device is the width no greater than the width of the fluid flow passage.

3. The apparatus for mixing as set forth in claim 1, wherein said controller is a counter-weight arm, arm rotatably attached to said rotating axis.

4. The apparatus for mixing as set forth in claim 1, wherein said bubble infusion means is fixedly attached to said flow restriction device at a location along flow restriction device that is radially opposed to internal mounting of flow restriction device to said rotating axis.

5. A method for increasing the efficiency of the dewatering of sludge in wastewater treatment, by increasing the mixing efficiency of polymer, sludge, and air, including the steps of
(a) Providing an in-line mixing apparatus to a sludge flow stream, said in-line mixing apparatus comprising (1) a mixer housing having a closed-liquid flow conduit configuration; (2) a housing inlet at one end of said housing and fluid flow passage; (3) a housing outlet at opposed axial ends of said housing and fluid flow passage; (4) a fluid flow passage for a sludge stream to flow through said mixer housing from the housing inlet to the housing outlet; (5) a rotating axis, said rotating axis traversing the opposed internal walls of the mixer housing at pivot points on the internal walls, (6) a flow restriction device internal to mixer housing and mounted to said rotating axis; (7) a controller means controllably engaged to flow restriction device, to control positioning of flow restriction device; (8) an air plenum, radially connected to said mixer; (9) an air inlet; (10) a bubble infusion means; (11) an air pumping means for introducing the air, through the air inlet, and through said bubble infusion means, into the fluid flow passage; (12) said air inlet means fixedly attached to bubble infusion means; (13) a plurality of polymer inlets circumferentially placed around said mixer, upstream of said bubble infusion means; (14) a polymer conduit axially connected to said polymer inlets; (15) a polymer pumping means for introducing polymer through the polymer inlets, and through the said conduit for polymer, into fluid flow passage; (16) a zone of intense mixing for mixture of sludge-polymer-air, said zone immediately downstream of interface between the fluid flow passage and the bubble infusion means; (17) a throat, said throat comprising an opening for sludge flow travel along the longitudinal axis of said mixer housing immediately downstream of zone of intense mixing, said throat having a cross-sectional area less than cross-sectional area of said housing inlet, said throat having a cross-sectional area less than cross-sectional area of said housing outlet; (18) said bubble infusion means provided upstream of said throat section; (19) a first conduit means connecting said throat to said housing inlet; (20) a second conduit means connecting said throat to said housing outlet, said conduit means having a width that increases in a divergent manner as it moves axially from said throat to said mixer housing outlet; (21) pressure gauge means to measure pressure of sludge mixture inside housing;
(b) Adding polymer to said sludge stream upstream of flow restriction device at said in-line mixing apparatus;
(c) Adding air to said sludge stream downstream of the polymer addition at said in-line mixing apparatus;
(d) Adding polymer and air into the sludge stream, independent of mixing energy, over changes in flow rate up to 33%, by adjustably controlling the speed of the sludge flow through the in-line mixer, during changes in the rate of sludge flow through the in-line mixer, by adjustably restricting the sludge flow with said flow restriction device;
(e) Shearing air bubbles into sludge stream with the force of the perpendicular velocity of the sludge flow stream flowing perpendicular to the introduction of air into the sludge flow stream;
(f) Creating highly charged air bubbles to aid the charge-driven activity of floc formation in dewatering, through the interaction of bubbles colliding with one another in the sludge flow after shearing.

6. The method as set forth in claim 5, further comprising the step of controlling the speed of the sludge flow by controlling the flow restriction device with a counter-weighted arm, rotatably connected to the flow restriction device.

7. The method as set forth in claim 5, further comprising the step of adjustably fixing the rate of addition of polymer.

* * * * *